United States Patent
Ikeda et al.

(10) Patent No.: US 7,554,592 B2
(45) Date of Patent: Jun. 30, 2009

(54) SOLID-STATE IMAGING DEVICE AND ITS DRIVING METHOD FOR PREVENTING DAMAGE IN DYNAMIC RANGE

(75) Inventors: Katsumi Ikeda, Miyagi (JP); Yuko Nomura, Miyagi (JP); Makoto Kobayashi, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 724 days.

(21) Appl. No.: 11/202,021

(22) Filed: Aug. 12, 2005

(65) Prior Publication Data

US 2006/0033829 A1    Feb. 16, 2006

(30) Foreign Application Priority Data

Aug. 13, 2004    (JP)    ............... 2004-235859

(51) Int. Cl.
*H04N 5/335*    (2006.01)

(52) U.S. Cl. .............. 348/311; 348/302; 348/272; 348/281; 348/282; 348/294

(58) Field of Classification Search ............. 348/302, 348/272, 281, 282, 294, 311
See application file for complete search history.

(56) References Cited

U.S. PATENT DOCUMENTS 6,774,350 B2 * 8/2004 Okada .................. 250/208.1
7,352,454 B2 * 4/2008 Bamji et al. ............ 356/141.1
2001/0055832 A1 * 12/2001 Schmitz et al. ............. 438/57
2003/0025816 A1 * 2/2003 Sakuragi ................. 348/301

FOREIGN PATENT DOCUMENTS

JP    10-136391 A    5/1998

OTHER PUBLICATIONS

Yamada Tetsuo et al., "A Progressive Scan CCD Imager for DSC Applications", ISSCC Digest of Technical Papers, Feb. 2000, pp. 110-111.

* cited by examiner

*Primary Examiner*—Tuan V Ho
*Assistant Examiner*—Quang V Le
(74) *Attorney, Agent, or Firm*—Birch, Stewart, Kolasch & Birch, LLP

(57) ABSTRACT

A solid-state imaging apparatus comprises a semiconductor substrate, a multiplicity of photo electric conversion elements, a vertical electric charge transfer device having a plurality of vertical electric charge transfer channels and transfer electrodes, reading out parts and a driving device that imposes a first voltage to the reading out electrode for reading out the accumulated signal electric charge from the photo electric conversion elements to the transfer channels in a reading out period and at a same time during the reading out period imposes a second voltage to at least one of the transfer electrodes adjoining to the reading out electrode for each photo electric conversion element for accumulating the signal electric charge in the vertical electric charge transfer channel under the one of the transfer electrode. Damage in the dynamic range of the solid-state imaging apparatus can be prevented.

8 Claims, 9 Drawing Sheets

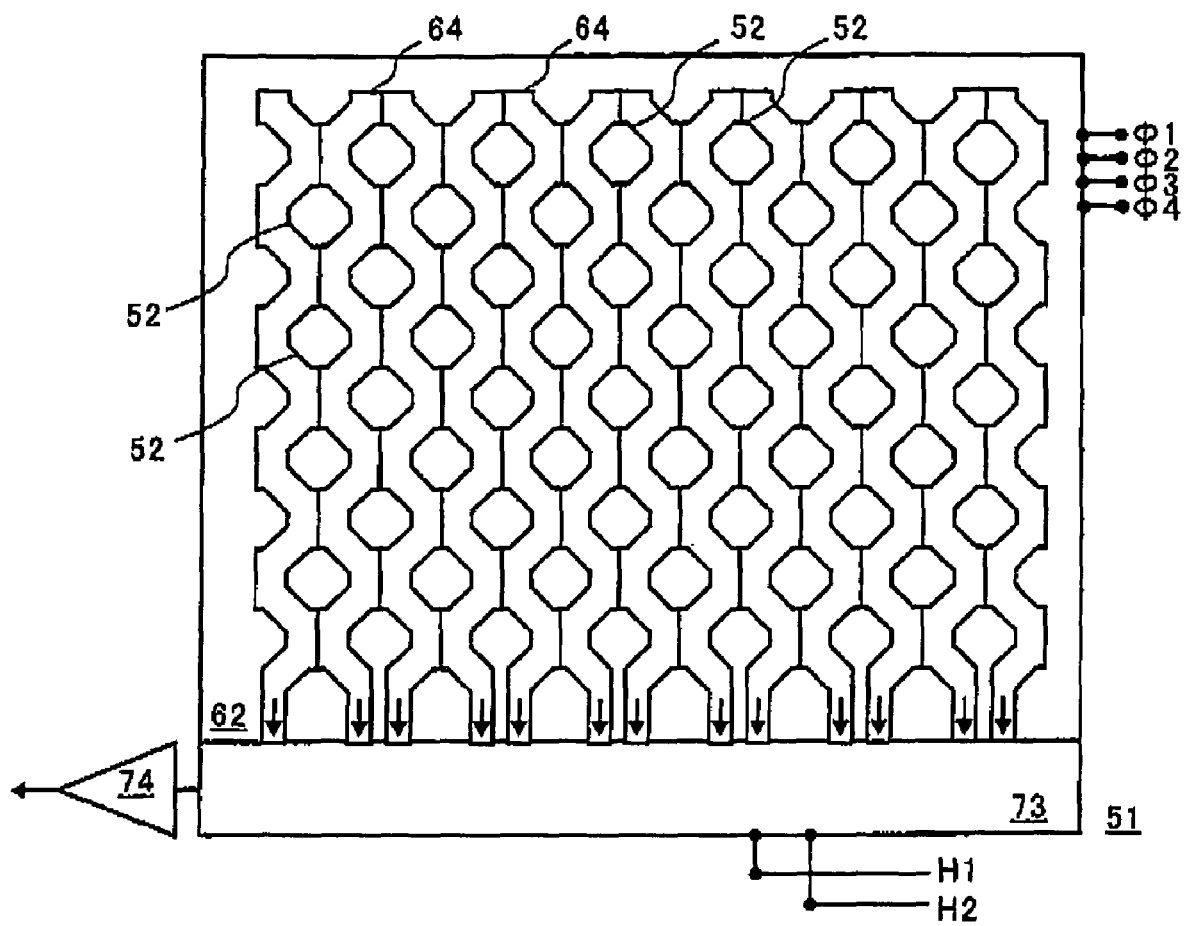

SOLID-STATE IMAGING DEVICE AND ITS DRIVING METHOD FOR PREVENTING DAMAGE IN DYNAMIC RANGE

CROSS REFERENCE TO RELATED APPLICATION

This application is based on Japanese Patent Application 2004-235859, filed on Aug. 13, 2004, the entire contents of which are incorporated herein by reference.

BACKGROUND OF THE INVENTION

A) Field of the Invention

This invention relates to a solid-state imaging apparatus and its driving method, and more in detail, relates to a solid-state imaging apparatus and a driving method of the solid-state imaging apparatus for preventing damage in a dynamic range of the solid-state imaging device.

B) Description of the Related Art

FIG. 8 is a schematic plan view showing a conventional solid-state imaging apparatus 51.

The solid-state imaging apparatus 51 is consisted of a light-receiving region 62 including a plurality of photoelectric conversion elements 52 and a vertical signal electric charge transfer device (a vertical charge coupled device: VCCD) transferring the signal electric charges generated by the photoelectric conversion elements 52, a horizontal signal electric charge transfer device (a horizontal charge coupled device: HCCD) 73 transferring the signal electric charges transferred by the VCCD 54 to a horizontal direction and an output amplifier 74.

The light-receiving region 62 in the imaging device adopting the pixel interleaved array CCD (PIACCD) as shown in the drawing is consisted of the plurality of the photoelectric conversion elements that are configured in a pixel interleaved arrangement. Between each row of the photoelectric conversion elements, a vertical electric charge transfer device 64 which reads the signal electric charges generated by the photoelectric conversion elements 52 and transfers them to a vertical direction are arranged by traversing in the spaces among the photoelectric conversion elements 52 in the vertical direction. Transfer channels are positioned in the zigzag spaces formed by the pixel interleaved arrangement, and the adjacent transfer channels apart from each other via the photoelectric conversion elements and come closer to each other via the channel stop region 53. For example, the details of the pixel interleaved arrangement can be found in Japanese Laid-Open Patent Hei10-136391 and Tetsuo Yamada, et al, Feb., 2000, "A Progressive Scan CCD Imager for DSC Applications", ISSCC Digest of Technical Papers, Page 110 to 111.

The vertical electric charge transfer device 64 is consisted of the vertical transfer channel 54 shown in FIG. 9 and transfer electrodes 16a and 16b which are formed over the vertical transfer channel 54 via an insulating film 10a and wobbling the photoelectric conversion elements 52 to the horizontal direction.

FIG. 9A is an enlarged plan view showing a part of the light receiving region 62 in the conventional solid-state imaging apparatus 51. FIG. 9B is an enlarged cross sectional view showing the conventional solid-state imaging apparatus 51 cut across a broken line A-B in FIG. 9A.

Each of the vertical transfer channel 54 is formed corresponding to each row of the photoelectric conversion elements 52, and transfers the signal electric charges read out via a reading-out gate channel region 51c formed adjoining to each photoelectric conversion element 52 to the vertical direction. A channel stop region 53 is positioned adjoining to the vertical transfer channel 54 on the opposite side of the reading-out gate channel region 51c. Moreover, the transfer electrodes 56 (the first layer poly-silicon electrode 56a and the second layer poly-silicon 56b) are formed over the vertical transfer channel 54 via the insulating film 60a. Furthermore, at the cross section of this part, only the second layer poly-silicon electrode 56b is positioned over the vertical transfer channel 54. Further, the conventional solid-state imaging apparatus 51 has a structure wherein the two vertical transfer channels 54 are adjoining via the channel stop regions 53.

During a reading-out period, the signal charges generated by the photoelectric conversion elements (pixel) 52 are read out to the vertical transfer channels by imposing a high level voltage (VH) to the first layer poly-silicon electrode 56b ($\phi$V1) or 56d ($\phi$V3) equipped on the reading-out gate channel region (reading-out part) 51c.

Thereafter, during a transfer period, the signal charges are transferred to the HCCD 73 by sequentially imposing a mid-level pulse (VM) or a low-level pulse (VL) to the transfer electrodes 56a to 56d. A horizontal transfer of the electric charges by the HCCD 73 is executed by the two-phase drive with HM/HL pulses during a period between the transfer operations of the VCCD 64 in the transfer period.

FIG. 10 shows electric potentials between a broken line E-F in FIG. 9B. An overflow drain that discharges an excessive signal electric charge of the photoelectric conversion elements 52 is formed by adding an inverse bias on an n-type substrate 51a to form an appropriate electric potential barrier between the photoelectric conversion element 52 and the n-type substrate 51a.

In the drawing, the electric potential indicated with a solid line is in a condition that the electric charges are accumulated in the photoelectric conversion element 52. Since a low voltage (VM or VL) is imposed on the electrode 56b, a reading part 51c is closed, and the accumulated signal charges are not read out to the vertical transfer channel 54.

In the drawing, the electric potential indicated with a dashed line is in a condition that a high voltage (VH) is imposed on the electrode 56b, and the electric potential barrier to the vertical transfer channel 54 from the photoelectric conversion elements 52 is eliminated by imposing a sufficient high voltage, and all the electric charges will move to the vertical transfer channel 54. Moreover, two vertical transfer channels 54 which are adjacent via the channel stop region 53 become high electric potential, although the channel stop region 53 divides them. Since the signal electric charges are accumulated in the vertical transfer channel 54 which is adjacent to the reading part 51c at the reading-out period, the signal charges that can be accumulated in the vertical channel 54 in terms of electric potential will not exceed the electric potential of the channel stop region 53.

FIG. 11A is a timing chart showing driving waveforms imposed on electrodes V1 to V4 consisted of the electrode 56a and the electrode 56b in the conventional solid-state imaging apparatus 51. This timing chart is indicated by peak values of VH, VM and VL. VH is a voltage at the reading-out period, and change in VM and VL relates to the operation in the transfer period. FIG. 11B is a schematic view representing conditions of the electric potentials of the vertical transfer channel 54 and movements of the signal electric charges when the driving waveforms shown in FIG. 11A are imposed. In the drawing, a white square indicates VL, a hatched square indicates VM and a black square indicates VH, and a hatched circle indicates the signal electric charges. The signal electric charges can be accumulated in the vertical transfer channel 54 when VM is imposed, and the vertical transfer channel 54 will be potential barrier when VL is imposed.

At a timing t1, the signal electric charges are accumulated in the photoelectric conversion elements 52. At a timing t3, the VH is imposed on reading electrodes V1 and the signal electric charges are moved from the photoelectric conversion elements 52 in every two lines in the vertical direction to the vertical transfer channel 54. At a timing t5, the signal electric charges are moved from the photoelectric conversion elements 52 in the remaining every two lines in vertical direction to the vertical transfer channel 54. At a timing t7, the signal electric charges are accumulated under the electrodes V2 and V3, and the transfer period will start in this condition.

FIG. 12 is an enlarged plan view showing a part enclosed with a double short-dashed line in FIG. 9A. In the drawing, S2 indicates a region of a channel formed by the electrode 56b at the reading-out period. An accumulation capacity at the reading-out period is decided approximately by a difference $\phi a$ between the electric potential of the vertical transfer channel 54 that is adjoining to the reading part 51c shown in FIG. 10 and the electric potential barrier of the channel stop region 53 and an area of the S2 and a static capacity for the area per unit (the maximum accumulation capacity equals to or approximately equals to $\alpha S2 \phi a$, when $\alpha$ is the static capacity for the area per unit).

In a case that this maximum accumulation capacity is smaller than the maximum accumulation capacity of the photoelectric conversion element 52, the signal electric charges flow into an adjacent vertical transfer channel 54m over the electric potential barrier of the channel stop region 53, and it causes a blooming phenomenon that will deteriorate an image of a blight part as the solid-state imaging apparatus. That is, the dynamic range will be lost as a reduction of the dealing signal amount. Moreover, this blooming phenomenon is appeared at the timings t3 and t5 in FIG. 11B.

SUMMARY OF THE INVENTION

It is an object of the present invention to provide a solid-state imaging apparatus that can prevent damage in a dynamic range.

According to one aspect of the present invention, there is provided a solid-state imaging apparatus, comprising: a semiconductor substrate defining a two-dimensional surface; a multiplicity of photo electric conversion elements positioned on lattice points of a first lattice of a tetragonal matrix and of a second lattice of which each lattice point is positioned at a center of the first lattice in a light receiving region of the semiconductor substrate; a vertical electric charge transfer device having a plurality of vertical electric charge transfer channels arranged vertically between rows of the photo electric conversion elements and a plurality of transfer electrodes horizontally arranged over the vertical electric charge transfer channels; reading out parts, each comprising a reading out electrode also serving as one of the transfer electrodes, corresponding to each one of the multiplicity of the photo electric conversion elements, and reading out a signal electric charge accumulated in the corresponding photo electric conversion element to the vertical electric charge transfer channels adjoining in a horizontal direction; and a driving device that imposes a first voltage to the reading out electrode for reading out the accumulated signal electric charge from the photo electric conversion elements to the transfer channels in a reading out period and at a same time during the reading out period imposes a second voltage to at least one of the transfer electrodes adjoining to the reading out electrode for each photo electric conversion element for accumulating the signal electric charge in the vertical electric charge transfer channel under the one of the transfer electrode.

According to the present invention, a solid-state imaging apparatus that can prevent damage in a dynamic range can be provided.

BRIEF DESCRIPTION OF THE DRAWINGS

FIG. 8 is a schematic view showing a conventional solid-state imaging apparatus 51.

DETAILED DESCRIPTION OF THE PREFERRED EMBODIMENTS

Figure 1:
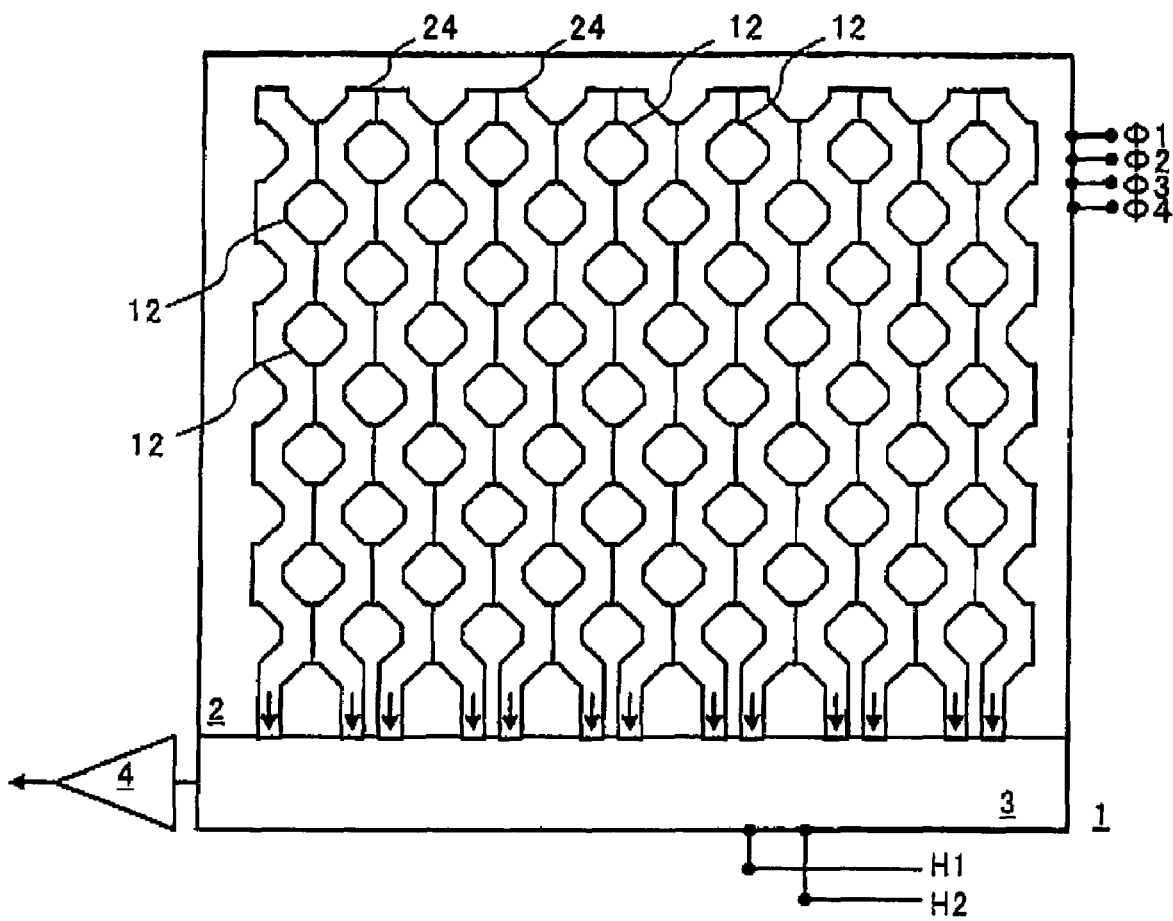
FIG. 1 is a schematic plan view showing a solid-state imaging apparatus 1 according to an embodiment of the present invention.

FIG. 1 is a schematic plan view showing a solid-state imaging apparatus 1 according to an embodiment of the present invention.

The solid-state imaging apparatus 1 is consisted of a light-receiving region 2 including a plurality of photoelectric conversion elements 12 and a vertical signal electric charge transfer device (a vertical charge coupled device: VCCD) 24 transferring the signal electric charges generated by the photoelectric conversion elements 12, a horizontal signal electric charge transfer device (a horizontal charge coupled device: HCCD) 3 transferring the signal electric charges transferred by the VCCD 24 to a horizontal direction and an output amplifier 4.

The light-receiving region 2 is consisted of the plurality of the photoelectric conversion elements 12 by configuring them in the so-called pixel interleaved arrangement or the honeycomb arrangement. The pixel interleaved arrangement used in this specification indicates an arrangement combining the first lattice of a two-dimensional tetragonal matrix and the second lattice of the two-dimensional matrix of which each lattice point is positioned at the center of the first lattice. For example, the photoelectric conversion elements 12 in the even numbered rows (lines) or columns and in the odd numbered rows (lines) or columns are shifted in the horizontal direction by about a half pitch of the photoelectric conversion elements 12, and the photoelectric conversion elements 12 in the even numbered lines (rows or columns) and in the odd numbered lines (rows or columns) are shifted in the vertical direction by about a half pitch of photoelectric conversion elements 12. Each row of the photoelectric conversion elements 12 includes the photoelectric conversion elements 12 in either one of the even numbered row and in the odd numbered row. Similarly, Each line of the photoelectric conversion elements 12 includes the photoelectric conversion elements 12 in either one of the even numbered line and in the odd numbered line. The pixel interleaved arrangement is one of the arrangement styles for arranging a multiplicity of the photoelectric conversion elements in a matrix having a plurality of rows and lines.

The phrase "about a half" represents a pitch including an exact half pitch and also a pitch regarded as substantially equal to the half pitch from the performance and image quality although this pitch is different from the exact half pitch because of manufacture tolerances, rounding errors of pixel positions caused from design or manufacturing of a mask or the like.

The vertical electric charge transferring device 24 that reads out the signal electric charges generated by the photoelectric conversion elements 12 and vertically transfers them are formed between columns of the photoelectric conversion elements 12 by vertically traversing between spaces of the photoelectric conversion elements 12. Transfer channels 14 are positioned in the zigzag spaces formed by the pixel interleaved arrangement, and the adjacent transfer channels 14 apart from each other via the photoelectric conversion elements 12 and come closer to each other via the channel stop region 13 (FIG. 2).

Figure 2:
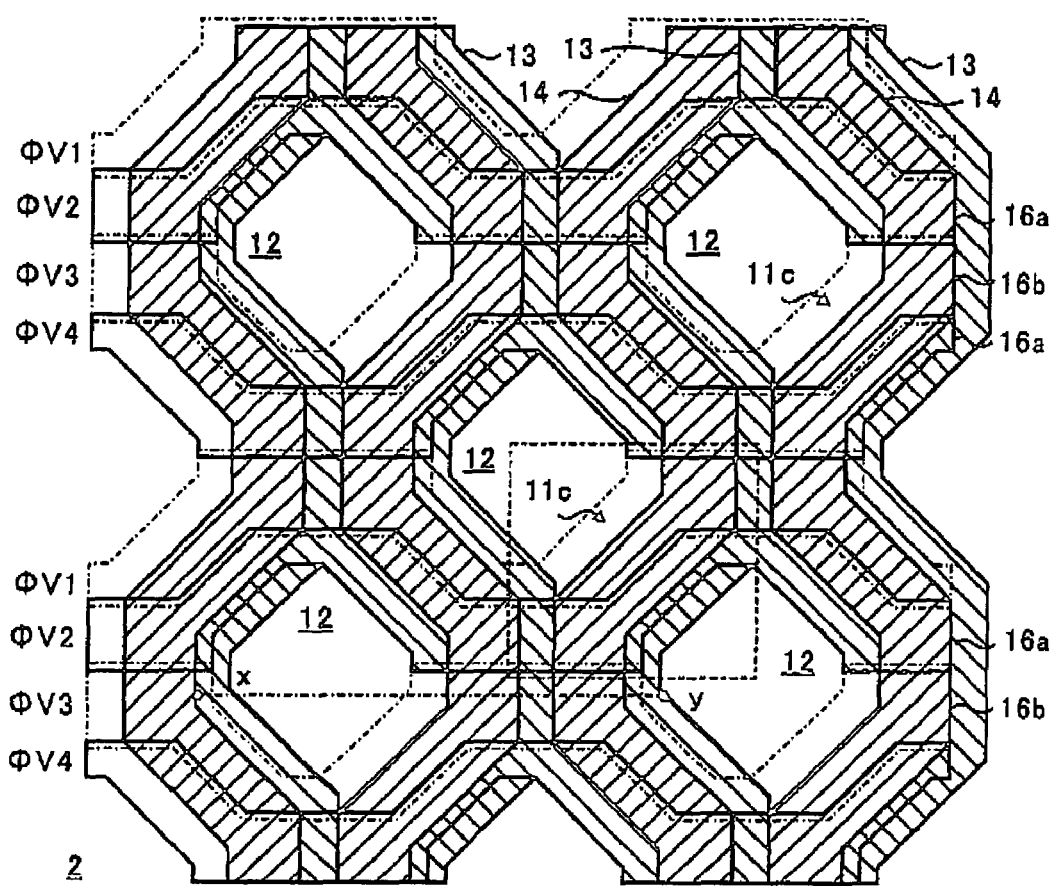
FIG. 2 is an enlarged plan view showing a part of a light-receiving region 2 of the solid-state imaging apparatus 1 according to the first embodiment of the present invention.

The vertical electric charge transfer device 24 is consisted of the vertical transfer channel 14 shown in FIG. 2 and transfer electrodes 16a and 16b (FIG. 2) which are formed over the vertical transfer channel 14 via an insulating film 10a (FIG. 3) and traversing between the photoelectric conversion elements 12 to the horizontal direction.

FIG. 2 is an enlarged plan view showing a part of the light-receiving region 2 of the solid-state imaging apparatus 1 according to the first embodiment of the present invention, and shows a condition wherein the insulating film on the semiconductor substrate is peeled to expose the photoelectric conversion elements 12 and the transfer electrodes 16.

Figure 3:
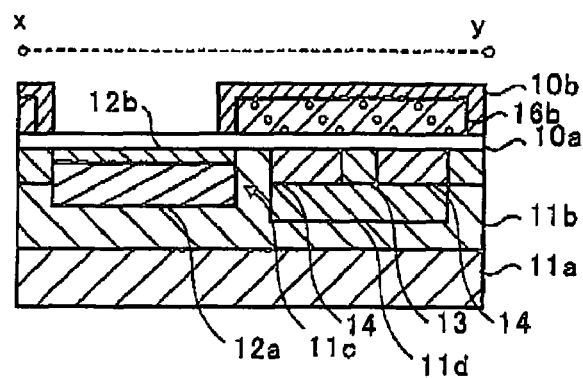
FIG. 3 is an enlarged cross sectional view of the solid-state imaging apparatus according to the first embodiment of the present invention.

FIG. 3 is an enlarged cross sectional view of the solid-state imaging apparatus 1 according to the first embodiment of the present invention. Moreover, this cross section shows the solid-state imaging apparatus cut across a single short-dashed line x-y in FIG. 2.

In the below-described explanation, in order to distinguish the degrees of impurity concentrations between impurity added regions having the same conductive type, it is transcribed as a $p^-$-type impurity added region, a p-type impurity added region and a $p^+$-type impurity added region, or an $n^-$-type impurity added region, an n-type impurity added region and an $n^+$-type impurity added region in sequence from the region that has relatively low in the impurity concentration. Except for a case that the $p^-$-type impurity added region 11b is formed by the epitaxial growing method, it is preferable that all the impurity added regions are formed by ion-implantation and a thermal treatment after that.

The semiconductor substrate 11 has, for example, an $n^-$-type silicon substrate 11a and the $p^-$-type impurity added region 11b formed in a surface of the substrate 11. The p-type impurity added region 11b is formed by the thermal treatment after the ion-implantation of p-type impurity on one surface of the $n^-$-type silicon substrate 11a, or performing the epitaxial growth of silicon containing p-type impurity on one surface of the n-type silicon substrate 11a.

Next, an n-type impurity added region (vertical transfer channels) 14 are formed in the $p^-$type impurity added region 11b having a width of, for example, 0.5 μm corresponding to one row of the photoelectric conversion elements 12 formed in the later process. Each of the vertical transfer channels 14 has flat impurity concentration in a longitudinal (vertical) direction, and extends along with the corresponding row of the photoelectric conversion elements 12.

Next, a channel stop region 13 is formed adjoining to the vertical transfer channel 14 (on an opposite side of a reading gate channel region 11c). The channel stop region 13 is formed of, for example, $p^+$-type impurity added region, trench isolation or local oxidation (LOCOS).

A part of the p-type impurity added region 11c is remained along with the right side of each photoelectric conversion element 12 (n-type impurity added region 12a) formed in the later process. Each p-type impurity added region 11c is used as a channel region 11c for the reading gate.

Next, an oxide film (or an ONO film) 15 is formed on the surface of the semiconductor substrate 11. The ONO film is composed by a lamination layer formed by laminating, for example, a silicon oxide film (thermal oxidation film) with thickness of about 20 to 70 nm, a silicon nitride film with thickness of about 30 to 80 nm and a silicon oxide film with thickness of about 10 to 50 nm in this order. In FIG. 2, the oxide film 15 is represented with one layer for convenience of the explanation. Moreover, the above described oxide film 15 can also be formed with single oxide film ($SiO_2$).

Next, an electrode forming process is executed. In this process, a transfer electrode (multilayered poly-silicon electrode) 16 is formed on the oxide film 15, The first polycrystalline Si layer 16a is laminated with thickness of 0.2 μm to 3 μm (for example, 1 μm) on the oxide film 15 formed on the surface of the semiconductor substrate 1, and a photo-resist film is applied on a surface of the first polycrystalline Si layer 16a. Then, after patterning the photo-resist film to a predetermined pattern by photolithography (exposure and development), by using the patterned photo-resist film as a mask, the first polycrystalline layer 16a in an unmasked region (a region without the mask) is etched off by dryetching (using chlorine-type gas) with strong anisotropy (high velocity of etching in vertical direction to the mask). By that, the first poly-silicon electrode 16a is formed.

Next, the Si surface is oxidized, and a $SiO_2$ film (the second oxide film) is formed on the first poly-silicon electrode 16a with thickness of 300 Å to 1000 Å. Moreover, the second polycrystalline Si layer 16b is laminated on the second oxide film with thickness of 0.2 μm to 3 μm (for example, 1 μm) by using reducing CVD method or the like. Then, the patterning of the second polycrystalline Si layer 16b is performed by using the photolithography, and the second layer poly-silicon electrode 16b is formed. Moreover, at the cross section of this part, only the second layer poly-silicon electrode 16b is positioned over the vertical transfer channel 14. Also, two vertical transfer channels 14 are adjacent via the channel stop region 13.

Next, predetermined points of the p⁻type impurity added regions 11b are converted to the n-type impurity added region 12a by ion implantation. Moreover, the n-type impurity added region 12a functions as an electric charge accumulation region. By converting the surface layer part of the n-type impurity added region 12a to the p⁺-type impurity added region 12b by ion implantation, a photoelectric conversion element 12 that is buried-type photo-diode is formed.

Next, an insulating film 10 is formed to cover the multi-layer poly-silicon electrodes 16 and a front surface of the silicon substrate 11, and a light shielding film (not shown in the drawing) is formed by laminating alloy consisted of two or more than two types of metals such as tungsten, aluminum, chrome, titan, molybdenum and the like by PVD or CVD. This light shielding film covers each transfer electrode 16 or the like and prevent unnecessary photoelectric conversion in a region other than the photoelectric conversion element 12. The light shielding film has one opening over each of the photoelectric conversion element 12. Moreover, a passivation layer, a planarizing insulating layer, a color filter layer, the second planarizing film and micro lenses are formed on the light shielding film.

The driving method of the solid-state imaging apparatus 1 according to the first embodiment of the present invention is explained in the below.

Figure 4A:
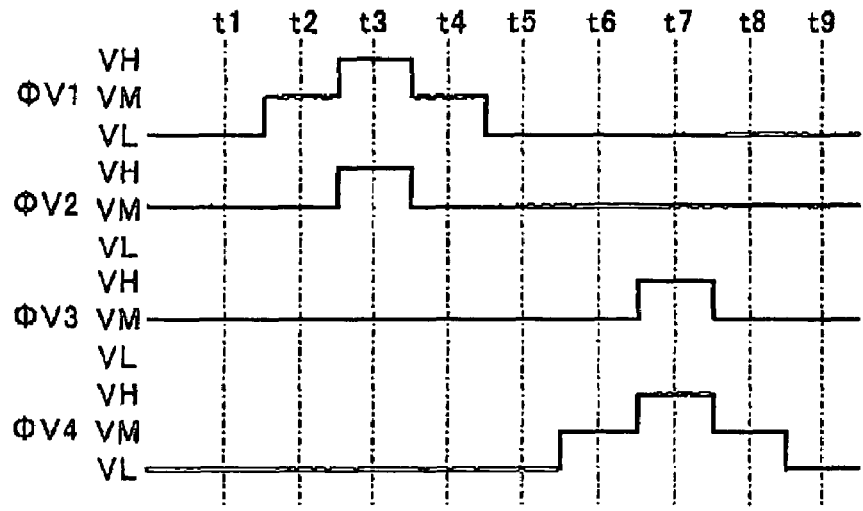
FIG. 4A is a timing chart showing a driving waveform.
Figure 4B:
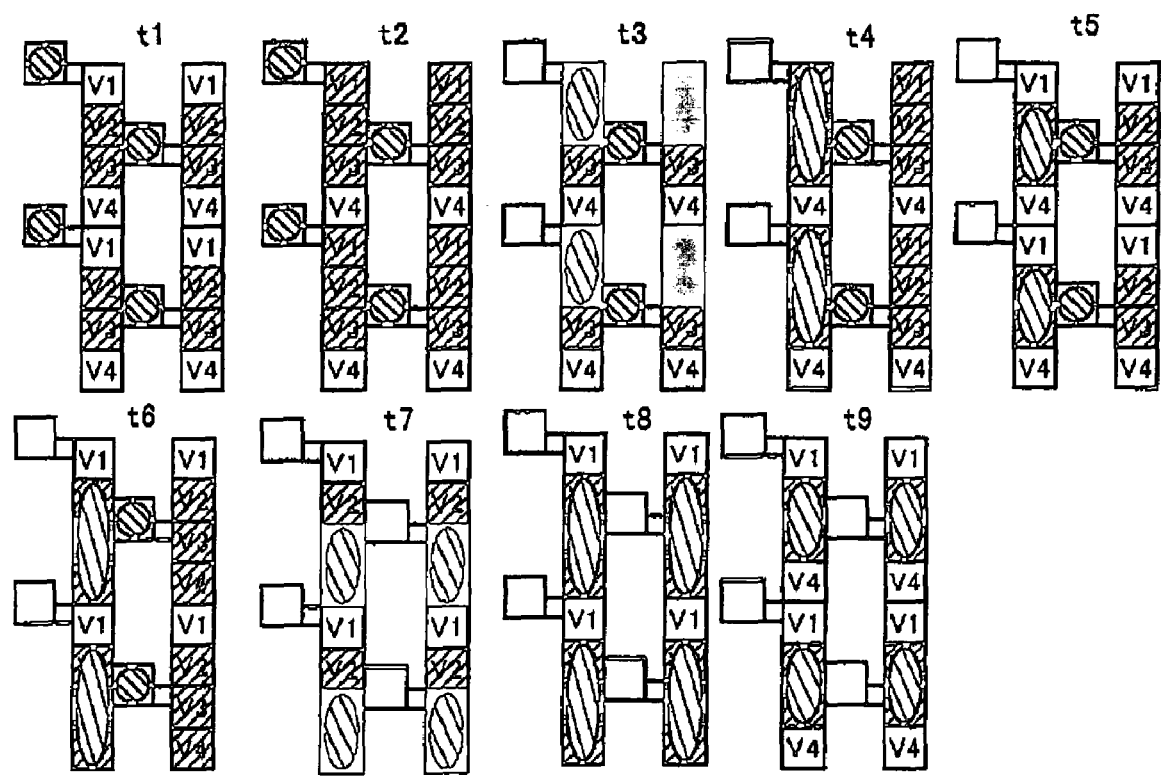
FIG. 4B is a schematic view showing changes in the electric potentials of the vertical transfer channel 14 and movements of the signal electric charges in the vertical transfer channel 14 according to the first embodiment of the present invention.

FIG. 4A is a timing chart showing driving waveforms imposed on the electrodes V1 to V4 that are consisted of the electrodes 16a and 16b of the solid-state imaging apparatus 1. This timing chart is depicted by peak values of VH, VM and VL. VH is a voltage at the reading out period, and changed in VM and VL relates to the movement at the transfer period. FIG. 4B is a schematic view showing changes in the electric potentials of the vertical transfer channel 14 and movements of the signal electric charges in the vertical transfer channel 14 when the driving waveforms shown in FIG. 4A are imposed. In the drawing, a white square indicates VL, a hatched square indicates VM and a black square indicates VH, and a hatched circle indicates the signal electric charges. The signal electric charges can be accumulated in the vertical transfer channel 14 when VM is imposed, and the vertical transfer channel 14 will be potential barrier when VL is imposed.

At timing t1, the signal electric charges are accumulated in the photoelectric conversion elements 12. At timing t3, VH is imposed on the reading electrodes of the V2 at the same time when VH is imposed on the reading electrodes of the V1, and the signal electric charges move from the photoelectric conversion elements 12 in every two lines in the vertical direction to the vertical transfer channel 14. At timing t7, VH is imposed on the reading electrodes of the V3 at the same time when VH is imposed on the reading electrodes of the V4, and the signal electric charges move from the photoelectric conversion elements 12 in the remaining every two lines in the vertical direction to the vertical transfer channel 14. At timing t9, it becomes a condition that the signal electric charges are accumulated under the V2 and V3, and the condition shifts to the transfer period. Moreover, the voltage imposed on the V3 at timing t7 may not be limited to VH, but also may be a voltage that can at least accumulate the signal charges under the V3.

Figure 5:
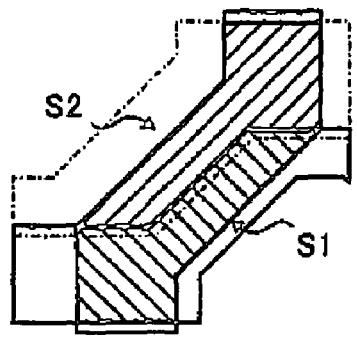
FIG. 5 is an enlarged plan view showing a part enclosed with a double short-dashed line in FIG. 2.

FIG. 5 is an enlarged plan view showing a part enclosed with a double short-dashed line in FIG. 2. In the drawing, S1 indicates a channel region to be formed by the electrode 16a at the reading out period, and S2 indicates a channel region to be formed by the electrode 16b at the reading out period.

In the first embodiment of the present invention, a plain area of the channel composing the maximum accumulation capacity shown in FIG. 5 will be S1+S2 at a part where the vertical transfer channels 14 adjoin by imposing VH on each of the electrodes V1, V2, V3 and V4 at timing t3 and t7. Comparing to the conventional solid-state imaging apparatus 51, the maximum accumulation capacity of the vertical transfer channel 14 at the reading out period can be about doubled. Therefore, the damage in the dynamic range of the solid-state imaging apparatus 1 can be prevented.

Figure 6:
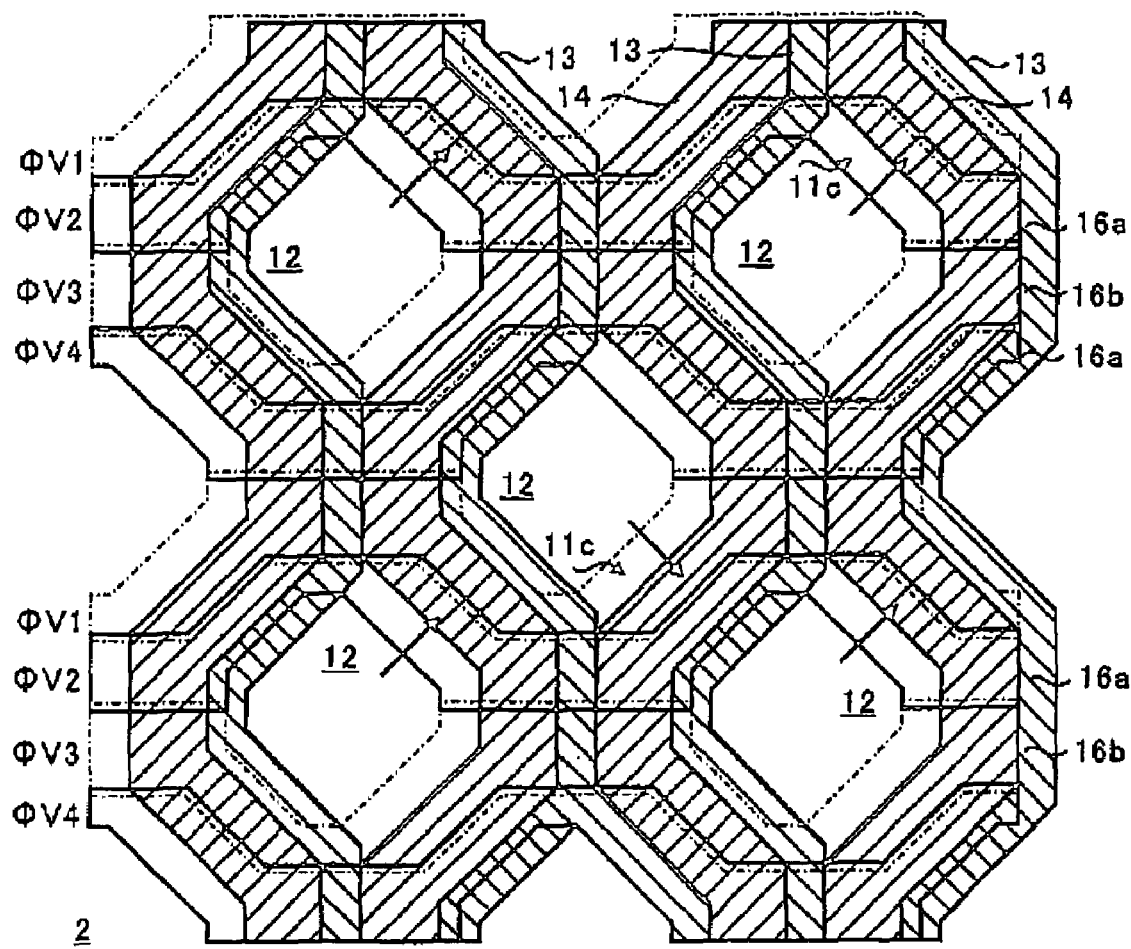
FIG. 6 is an enlarged plan view showing a part of a light-receiving region 2 of the solid-state imaging apparatus 1 according to the second embodiment of the present invention.

FIG. 6 is an enlarged plan view showing a part of a light-receiving region 2 of the solid-state imaging apparatus 1 according to the second embodiment of the present invention. The insulating film on the semiconductor substrate is peeled, and a condition exposing the photoelectric conversion elements 12 and the transfer electrodes 16 is shown in the drawing. Structural difference from the first embodiment of the present invention is a point that the reading part 11c is composed of 2 electrodes adjacent to the photoelectric conversion element 12. Other components of the second embodiment are the same as those in the first embodiment; therefore the explanation of the same components will be omitted.

A driving method of the solid-state imaging apparatus 1 according to the second embodiment of the present invention is explained in the below.

Figure 7A:
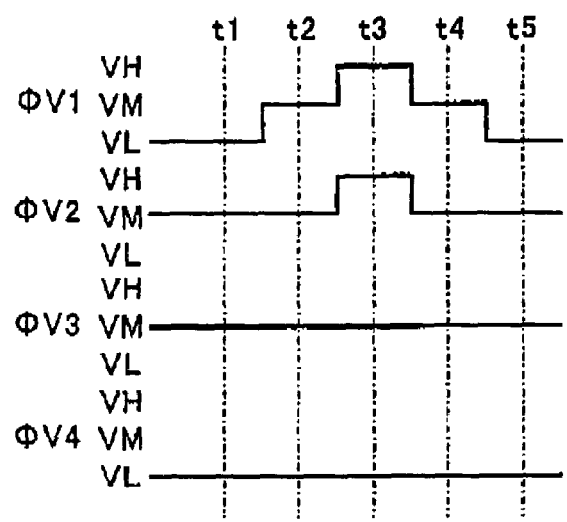
FIG. 7A is a timing chart showing a driving waveform.
Figure 7B:
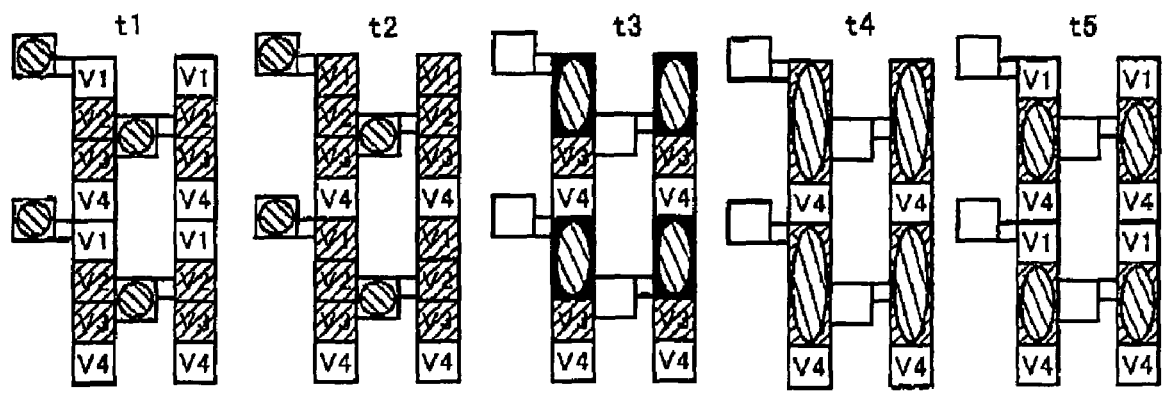
FIG. 7B is a schematic view showing changes in the electric potentials of the vertical transfer channel 14 and movements of the signal electric charges in the vertical transfer channel 14 according to the second embodiment of the present invention.
Figure 9A:
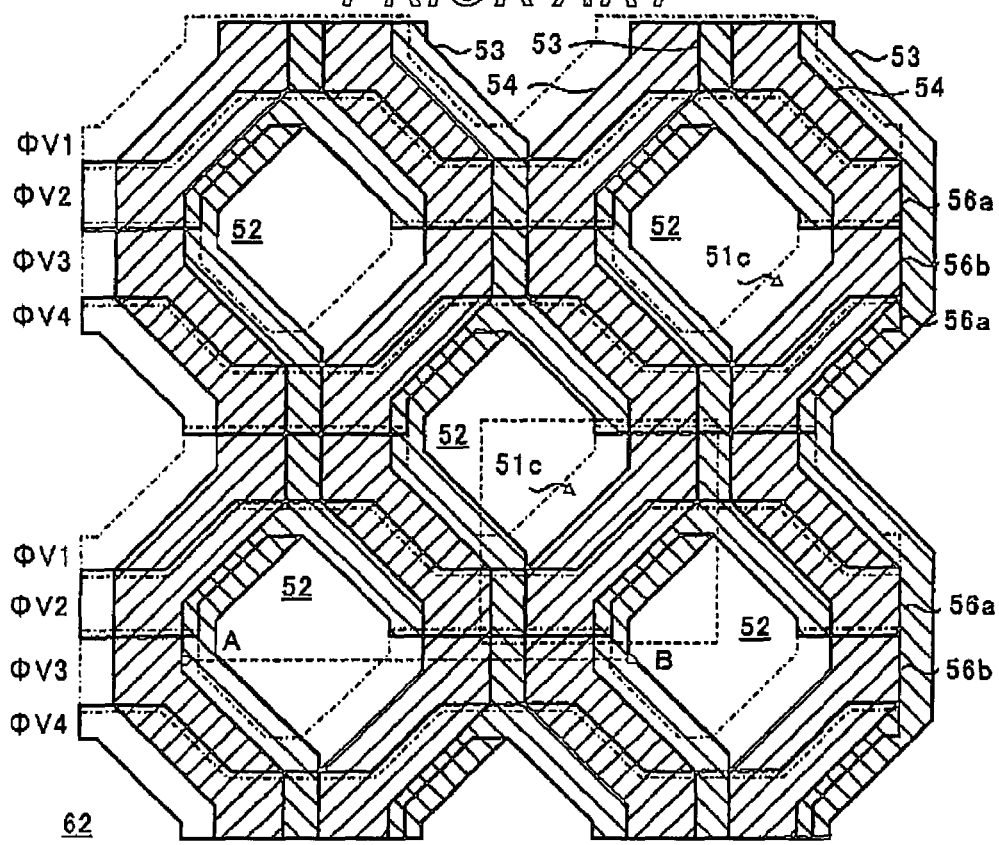
FIG. 9A is an enlarged plan view of the conventional solid-state imaging apparatus 51.
Figure 9B:
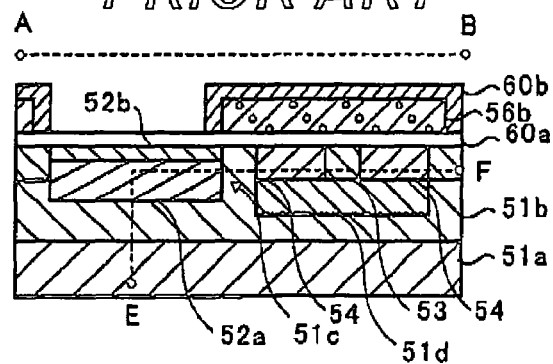
FIG. 9B is an enlarged cross sectional view showing a part of the light-receiving region 62 of the conventional solid-state imaging apparatus 51.
Figure 10:
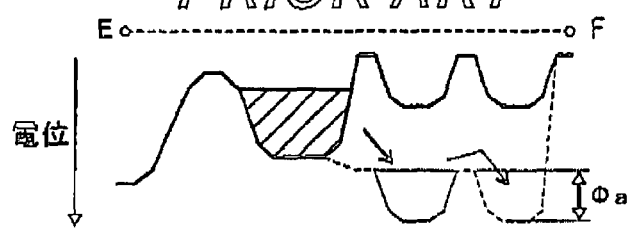
FIG. 10 shows an electric potential between a broken line E-F in FIG. 9B.
Figure 11A:
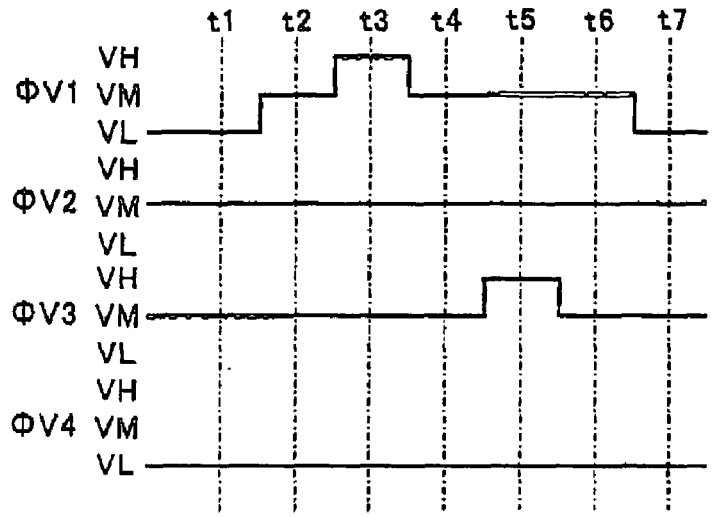
FIG. 11A is a timing chart showing a driving waveform.
Figure 11B:
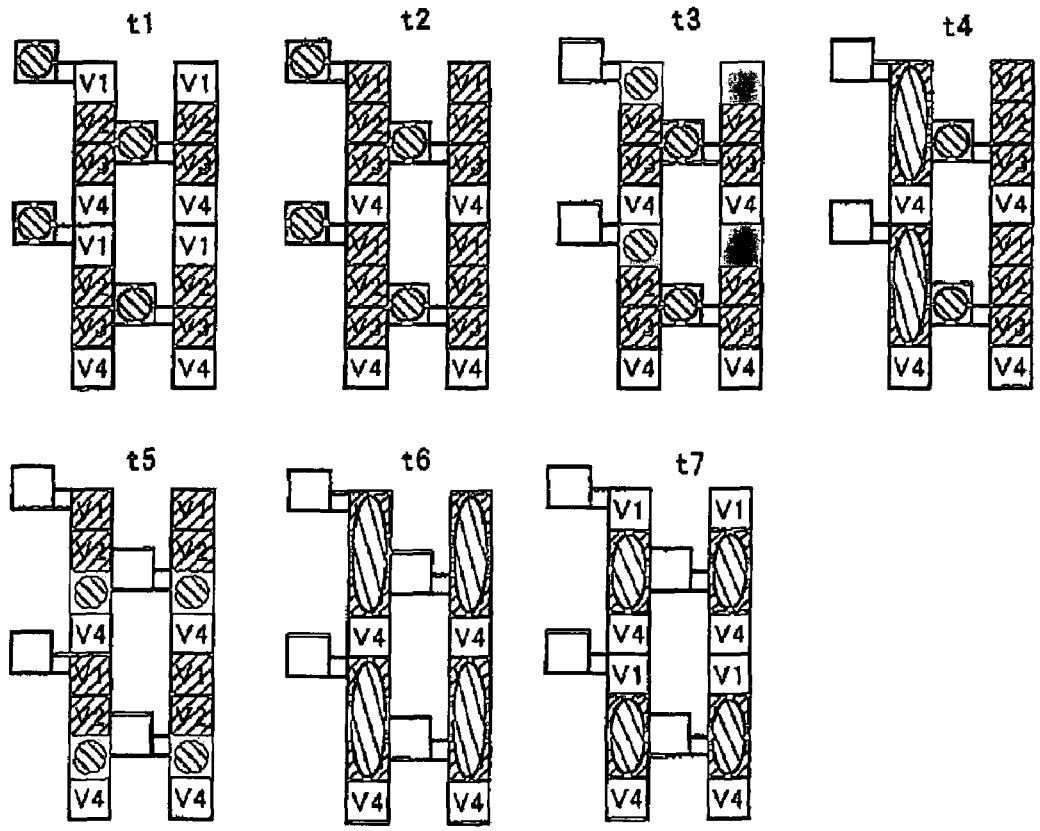
FIG. 11B is a schematic view changes in the electric potentials of the vertical transfer channel 54 and movements of the signal electric charges in the vertical transfer channel 54 according to the conventional embodiment.
Figure 12:
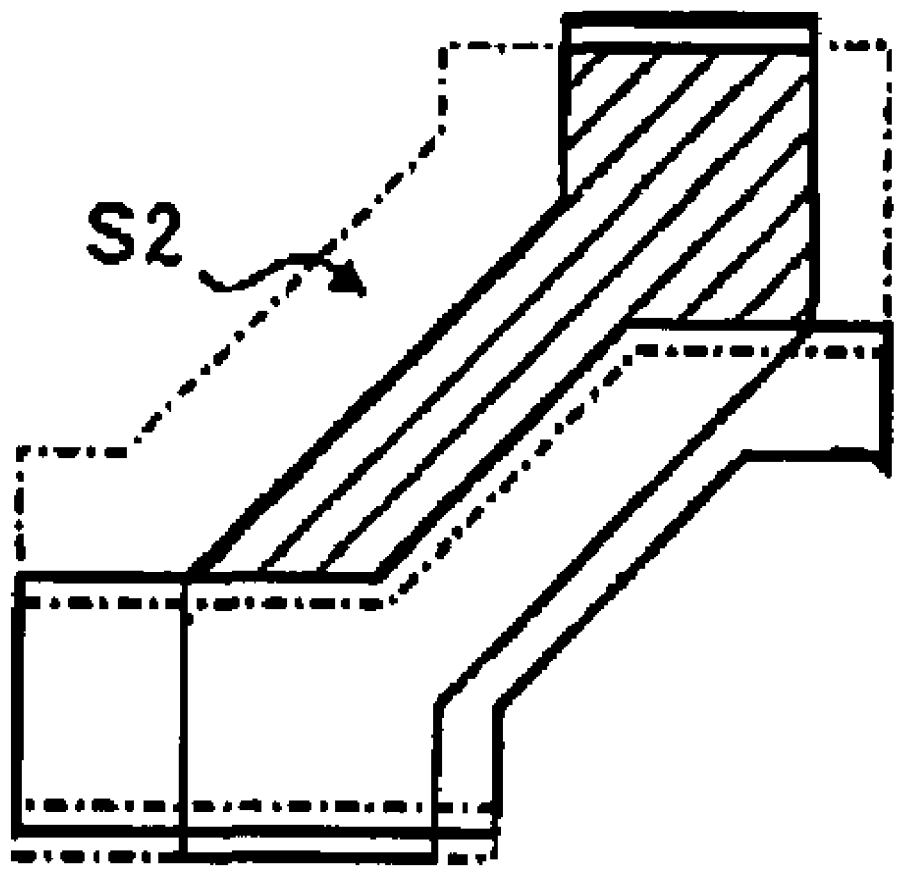
FIG. 12 is an enlarged plan view showing a part enclosed with a double short-dashed line in FIG. 9A.

FIG. 7A is a timing chart showing a driving waveform imposed on the electrodes V1 to V4 that are consisted of the electrodes 16a and 16b of the solid-state imaging apparatus 1. This timing chart is depicted by peak values of VH, VM and VL. VH is a voltage at the reading out period, and changed in VM and VL relates to the movement at the transfer period. FIG. 7B is a schematic view showing changes in the electric potentials of the vertical transfer channel 14 and movements of the signal electric charges in the vertical transfer channel 14 when the driving waveforms shown in FIG. 7A are imposed. In the drawing, a white square indicates VL, a hatched square indicates VM and a black square indicates VH, and a hatched circle indicates the signal electric charges. The signal electric charges can be accumulated in the vertical transfer channel 14 when VM is imposed, and the vertical transfer channel 14 will be potential barrier when VL is imposed.

At timing t1, the signal electric charges are accumulated in the photoelectric conversion elements 12. At timing t3, VH is imposed on the reading electrodes of the V2 at the same time when VH is imposed on the reading electrodes of the V1, and the signal electric charges move from the photoelectric conversion elements 12 in all rows to the vertical transfer channel 14. At timing t5, it becomes a condition that the signal electric charges are accumulated under the V2 and V3, and the condition shifts to the transfer period.

In the second embodiment of the present invention, by reading out the electric charges as described in the above, it will be unnecessary to impose VH on all of the φV1 to φV4, and a necessary number of a three-level driver to impose the voltage VH at the reading out period will be half comparing to the conventional technique. Therefore, cost reduction and low electricity consumption can be realized by reducing the three-level driver.

Moreover, the electric charges in all the pixels can be read out at the same time in the reading out period. Therefore, difference in an accumulation time of the signal electric charge between the rows of the pixels when it is desired to obtain signal electric charges in a shot accumulation time by fully depleting the photoelectric conversion elements 12 by impressing a high voltage to the n-type substrate 11 a at the reading out period. For example, when a color arrangement differs in every row for obtain color signals, so-called difference in white balance wherein a color signal ratio is different between a short time accumulation and a long time accumulation can be prevented.

Moreover, in the second embodiment, damage in a dynamic range of the solid-state imaging apparatus 1 can be prevented by multiplying the area of the channel that is the maximum accumulation capacity as same as the first embodiment of the present invention.

Moreover, the above-described embodiment has been explained with the four-phase ($\phi$V1 to $\phi$V4) driving method; however, the same effect can be obtained by the well-known eight-phase driving method or the six-phase driving method.

The present invention has been described in connection with the preferred embodiments, The invention is not limited only to the above embodiments. It is apparent that various modifications, improvements, combinations, and the like can be made by those skilled in the art.

What are claimed are:

1. A solid-state imaging apparatus, comprising:
    a semiconductor substrate defining a two-dimensional surface;
    a multiplicity of photo electric conversion elements positioned on lattice points of a first lattice of a tetragonal matrix and of a second lattice of which each lattice point is positioned at a center of the first lattice in a light receiving region of the semiconductor substrate;
    a vertical electric charge transfer device having a plurality of vertical electric charge transfer channels arranged vertically between rows of the photo electric conversion elements and a plurality of transfer electrodes horizontally arranged over the vertical electric charge transfer channels;
    reading out parts, each comprising a reading out electrode also serving as one of the transfer electrodes, corresponding to each one of the multiplicity of the photo electric conversion elements, and reading out a signal electric charge accumulated in the corresponding photo electric conversion element to the vertical electric charge transfer channels adjoining in a horizontal direction; and
    a driving device that imposes a first voltage to the reading out electrode for reading out the accumulated signal electric charge from the photo electric conversion elements to the transfer channels in a reading out period and at a same time during the reading out period imposes a second voltage to at least one of the transfer electrodes adjoining to the reading out electrode for each photo electric conversion element for accumulating the signal electric charge in the vertical electric charge transfer channel under the one of the transfer electrode.

2. The solid-state imaging apparatus according to claim 1, wherein each of said reading out electrode on which the first voltage is imposed and said at least one of the transfer electrodes on which the second voltage is imposed is included in the reading part for the photo electric conversion element in the row of the photo electric conversion elements different from one another.

3. The solid-state imaging apparatus according to claim 1, wherein said reading out electrode on which the first voltage is imposed and said at least one of the transfer electrodes on which the second voltage is imposed are adjoining to same photo electric conversion element.

4. The solid-state imaging apparatus according to claim 3, wherein each of said reading out electrode on which the first voltage is imposed and said at least one of the transfer electrodes on which the second voltage is imposed is included in the reading part for the photo electric conversion element in the row of the photo electric conversion elements different from one another.

5. A driving method for solid-state imaging apparatus, comprising:
    a semiconductor substrate defining a two-dimensional surface;
    a multiplicity of photo electric conversion elements positioned on lattice points of a first lattice of a tetragonal matrix and of a second lattice of which each lattice point is positioned at a center of the first lattice in a light receiving region of the semiconductor substrate;
    a vertical electric charge transfer device having a plurality of vertical electric charge transfer channels arranged vertically between rows of the photo electric conversion elements and a plurality of transfer electrodes horizontally arranged over the vertical electric charge transfer channels;
    reading out parts, each comprising a reading out electrode also serving as one of the transfer electrodes, corresponding to each one of the multiplicity of the photo electric conversion elements, and reading out a signal electric charge accumulated in the corresponding photo electric conversion element to the vertical electric charge transfer channels adjoining in a horizontal direction, and
    the method is characterized by imposing a first voltage to the reading out electrode for reading out the accumulated signal electric charge from the photo electric conversion elements to the transfer channels in a reading out period and at a same time during the reading out period imposing a second voltage to at least one of the transfer electrodes adjoining to the reading out electrode for each photo electric conversion element for accumulating the signal electric charge in the vertical electric charge transfer channel under the one of the transfer electrode.

6. The driving method according to claim 5, wherein each of said reading out electrode on which the first voltage is imposed and said at least one of the transfer electrodes on which the second voltage is imposed is included in the reading part for the photo electric conversion element in the row of the photo electric conversion elements different from one another.

7. The driving method according to claim 5, wherein said reading out electrode on which the first voltage is imposed and said at least one of the transfer electrodes on which the second voltage is imposed are adjoining to same photo electric conversion element.

8. The driving method according to claim 5, wherein each of said reading out electrode on which the first voltage is imposed and said at least one of the transfer electrodes on which the second voltage is imposed is included in the reading part for the photo electric conversion element in the row of the photo electric conversion elements different from one another.

* * * * *